United States Patent Office 2,864,947
Patented Dec. 16, 1958

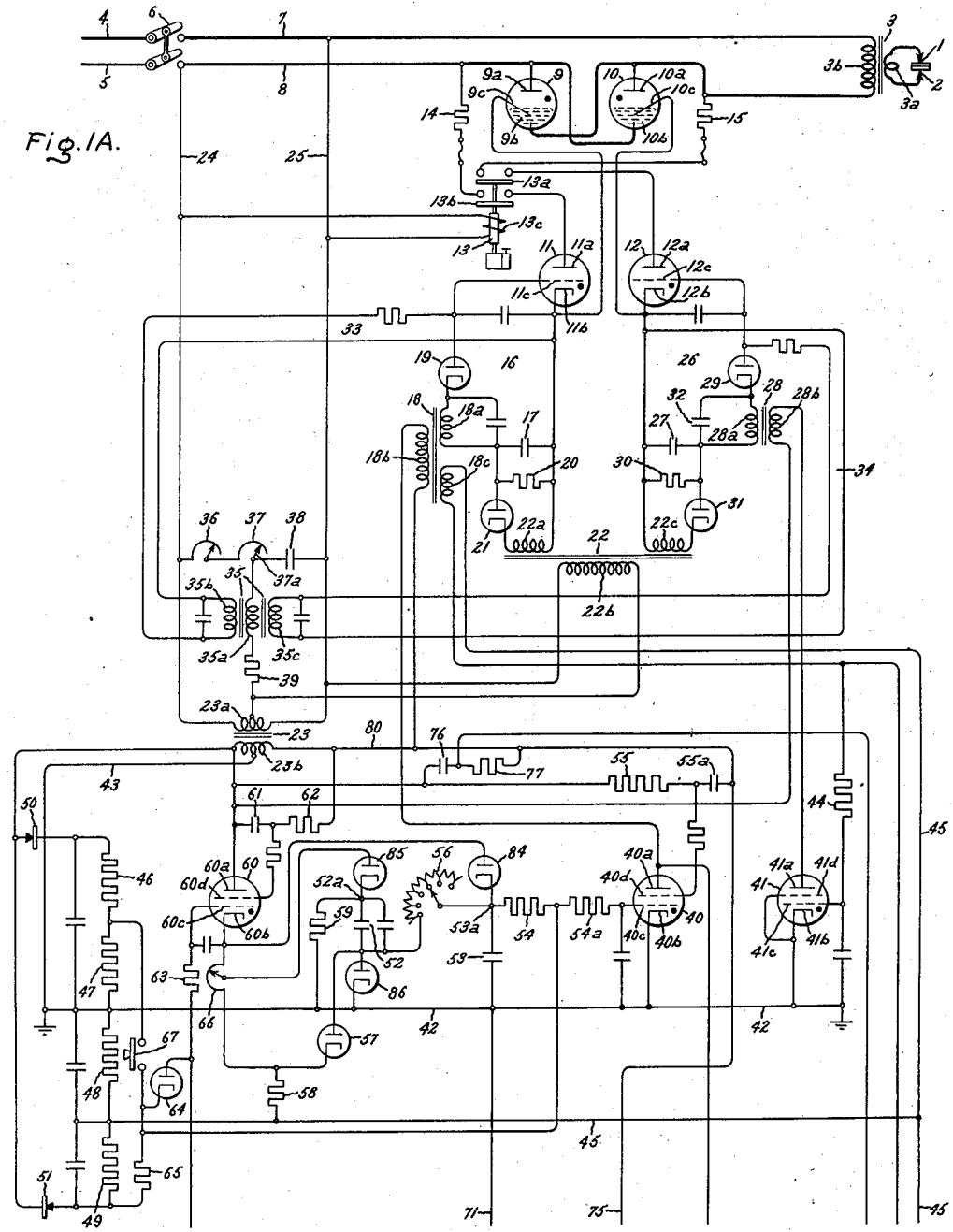
Fig. IA.

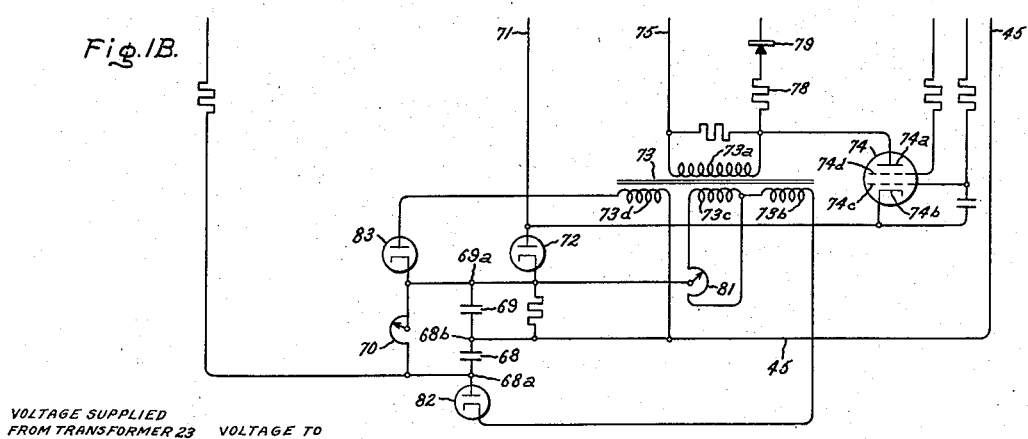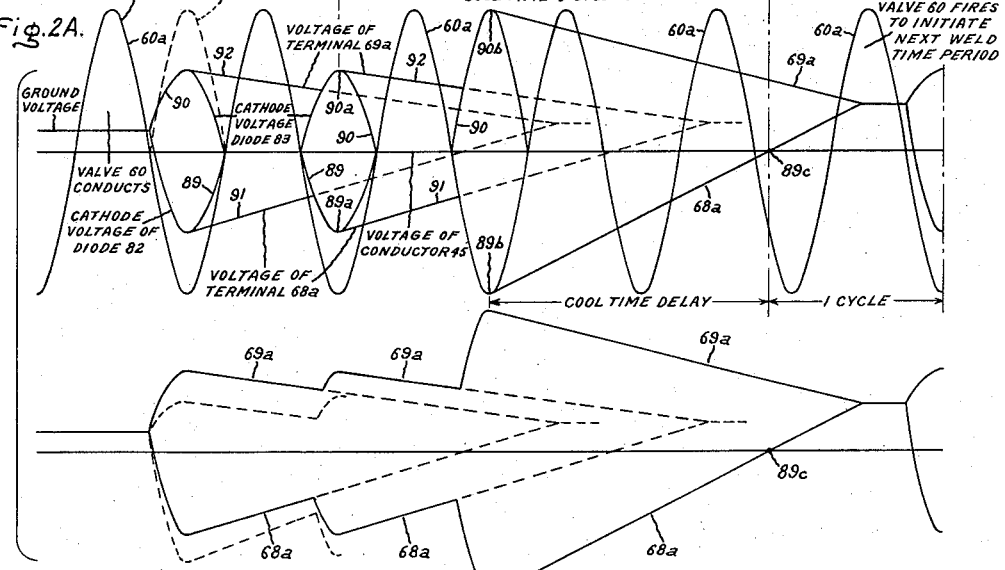

2,864,947
ELECTRIC TIMER

Maurice E. Bivens and William B. Hills, Schenectady, N. Y., assignors to General Electric Company, a corporation of New York Application June 14, 1954, Serial No. 436,588

8 Claims. (Cl. 250—27)

This invention relates to electric timers, and more particularly to capacitor type timers, and it has for an object the provision of a simple, reliable and improved timer of this character.

More specifically, the invention relates to capacitor type timers which are used to provide precision timing of an operation of a device or machine which follows closely upon a previous timed operation such, for example, as timing the nonconducting period of an electric valve following a timed conduction period.

Extreme accuracy of timing is required in a number of industrial operations. For example, for resistance seam welding operations, it may be specified that the accuracy of timing the "weld" periods and the intervening "cool" periods shall be plus or minus zero cycles for welding and cooling periods ranging from 1 to 15 cycles of a 60-cycle alternating current and plus or minus 1 cycle for welding and cooling periods ranging from 16 to 30 cycles. In timing the weld period, it is only required that the timing circuit shall apply and maintain on the control electrode of a timing electric valve a positive timing voltage which decreases in magnitude with the passage of time and becomes sufficiently negative at the precise predetermined end of the welding period to terminate conduction of the timing valve. On the other hand, for timing the succeeding cool period during which no welding current flows, it is required that the timing circuit shall supply to and maintain on the control electrode of such timing valve a negative voltage which decreases in magnitude with the passage of time and becomes sufficiently less negative to initiate conduction in such timing valve precisely at the end of the last half cycle of the cool period. A double capacitor type timing circuit which provides the required accuracy of timing for the welding period is disclosed and claimed in application Ser. No. 311,503, M. E. Bivens, filed September 25, 1952, Now Patent No. 2,765,402, issued October 2, 1956, and assigned to the assignee of the present invention. In order to produce uniform timing of cool periods following welding periods, the timing of the cool period must begin at the end of the last half cycle of welding current. An implication of this requirement is that both capacitors of a double capacitor timer shall receive their charging voltage in the half cycle immediately following the last half cycle of welding current in order that the ratio of the charges on the two capacitors shall invariably be the same at the instants of initiation of successive cool timing periods. Formidable problems are encountered in meeting these requirements and still providing on the control electrode of the timing valve a decreasing negative timing voltage which becomes sufficiently less negative with respect to its cathode to fire the timing valve. Accordingly, a further object of this invention is the provision of a double capacitor type timer for the cool period in which the capacitors receive their full charge in the half cycle immediately following the last half cycle welding current and which produces on the control electrodes of the timing valve a negative timing voltage which becomes sufficiently less negative to render such timing valve conductive in the half cycle immediately following the precise predetermined last half cycle of the cool period.

In carrying the invention into effect in one form thereof, a first electric valve having an input and an output circuit is provided with a timing circuit which is connected to its input circuit. An initiating device and a second electric valve having an input circuit controlled thereby cause the timing circuit to supply to the first valve a timing voltage to effect a variation in the conductivity of its output circuit enduring for a predetermined interval of time. A second timing circuit which is responsive to the initiation of such conductivity variation furnishes a control voltage to the input circuit of the second valve to render it ineffective to exercise any further control on the first timing circuit during the remainder of the predetermined time interval. The second timing circuit is also responsive to the termination of such conductivity variation for supplying to the control electrode of the second valve a variable timing voltage which renders it effective to cause the first timing circuit to effect a repeat timed operation of the variation in the conductivity of the first valve beginning a precise time interval after the end of the first one. This second timing circuit includes two capacitors together with means for simultaneously charging both to voltages which are related to their capacitances to result in charging the capacitors with unequal quantities of electricity. A resistor completes a local discharge circuit in which two capacitors are connected in series relationship with terminals of unlike polarity toward each other to provide for discharge of one of the capacitors into the other. Connections from the terminals of one of the capacitors supply the timing voltage to the input circuit of the second valve.

For a better and more complete understanding the invention, reference should now be had to the following specification and to the accompanying drawings of which Figs. 1A and 1B together constitute a simple diagrammatic sketch of a preferred embodiment of the invention and Figs. 2A and 2B are charts of characteristic curves which facilitate an understanding of the invention.

In illustrating the invention in one form, it is shown in Figs. 1A and 1B as employed for timing the welding period and the cool period of a resistance seam welding control system for a resistance welding machine.

Two pieces of metal which constitute the work piece and which are to be welded together are firmly held between two welding electrodes 1 and 2 which for seam welding may be in the form of wheels made of a good conducting material such as copper. As shown, these electrodes are connected in circuit with the secondary winding 3a of a welding transformer 3 of which the primary winding 3b is supplied from a suitable source of alternating voltage such as the energized supply conductors 4 and 5 to which it is connected by means of a switch 6, conductors 7 and 8 and a pair of main electric valves 9 and 10 which are inversely connected in parallel with each other between the supply conductors 4 and 5 and the primary winding 3b of the welding transformer. Preferably, the valves 9 and 10 are ignitrons and are provided with anodes 9a and 10a, mercury pool cathodes 9b and 10b, and control electrodes 9c and 10c in the form of igniter electrodes which project into the mercury pools. The main ignitron valves 9 and 10 are usually referred to as an ignitron contactor. Their main purpose is to complete and to interrupt the flow of welding current in the welding circuit.

The firing circuits of the main electric valves 9 and 10 are completed through the anode-cathode circuits of an auxiliary pair of electric valves 11 and 12, contacts 13a and 13b of a relay 13, current limiting resistors 14 and 15 and the primary winding 3b of the welding transformer. Relay 13 is a time delay closing relay having its operating coil 13c connected across supply conductors 7 and 8. It is employed for the purpose of preventing the completion of the firing circuits of the main ignitron valves 9 and 10 until the temperatures of the heated cathodes of the auxiliary valves arrive at the proper operating temperature. The auxiliary electric valves 11 and 12 are preferably thyratrons and are provided with anodes 11a and 12a, cathodes 11b and 12b, and control electrodes 11c and 12c. Their control electrode circuits have the organization which is disclosed and claimed in Patent 2,574,373 which is assigned to the assignee of this invention. Each of the control electrode circuits of the thyratrons is provided with two parallel branch circuits which control the number of half cycles which the thyratrons conduct and the instant in each half cycle of positive anode voltage at which the conduction is initiated. The timing branch 16 for thyratron 11 extends from its cathode 11b through capacitor 17, the secondary winding 18a of a transformer 18 and cathode-anode circuit of a diode valve 19. Capacitor 17 has a shunting resistor 20 and is charged through a diode electric valve 21 which is connected in circuit with the secondary winding 22a of a transformer 22 of which the primary winding 22b is connected across the midtap and one end terminal of the primary winding 23a of a transformer 23 which is supplied from supply conductors 7 and 8 to which it is connected through conductors 24 and 25. The connections are poled so that capacitor 17 presents a negative bias voltage toward control electrode 11c of thyratron 11. This bias voltage is opposed by the voltage induced in secondary winding 18a when transformer 18 is energized.

The timing branch 26 of the control electrode circuit for firing valve 12 has the same organization as that just described. It extends from cathode 12b through capacitor 27, secondary winding 28a of transformer 28 and the cathode-anode circuit of a diode 29 to the control electrode 12c. Capacitor 27 is shunted by a resistor 30 and is charged through a diode valve 31 and the secondary winding 22c of the transformer 22. A capacitor 32 is connected across the secondary winding 28a.

For controlling the instant in the positive half cycle of anode voltage at which the firing valves 11 and 12 become conducting, branch circuits 33 and 34 are provided. These branch circuits extend from cathodes 11b and 12b through secondary windings 35b and 35c of a transformer 35 and through current limiting resistors to the control electrodes 11c and 12c. The primary winding 35a of transformer 35 is in the output circuit of a phase shift bridge network of which the two halves of the mid-tapped primary winding 23a constitute two of its arms and rheostats 36 and 37 and the capacitor 38 constitute the other two arms. As shown the primary winding 35a is connected in series with resistor 39 between the slider 37a of rheostat 37 and the mid-tap of the primary winding 23a. Adjustments of rheostats 36 and 37 vary the phase of the voltages which are induced in the secondary windings 35b and 35c and thus determine the points in the positive half cycles of their anode voltages at which the firing circuit valves 11 and 12 become conducting and fire the main ignitron valves 9 and 10.

The two branches of the control electrode circuit for each of the firing valves 11 and 12 coact by reason of their interconnection through diodes 19 and 29 to apply to the control electrodes the more negative of the two voltages of each of the two branches. Thus as long as the negative bias voltages of capacitors 17 and 27 are unopposed by turn-on voltages supplied through the secondary windings 18a and 28a, the firing circuit valves 11 and 12 are maintained non-conducting. However, when these turn-on voltages exceed the negative bias voltages, the valves 11 and 12 become conducting at points in their positive half cycles cycles of anode voltage which are determined by the setting of rheostats 36 and 37.

The turn-on voltages are induced in the timing branches of the control electrode circuits by operation of timing valves 40 and 41. Preferably these valves are thyratrons and are respectively provided with anodes 40a and 41a, cathodes 40b and 41b and control electrodes 40c and 41c. Alternating voltages which are displaced from each other 180 degrees are supplied to the anodes 40a and 41a by means of transformer 23 to the opposite terminals of the secondary winding 23b of which anodes 40a and 41a are connected through primary windings 18b and 28b of transformers 18 and 28, respectively, and to the center tap of which the cathodes 40b and 41b are connected by means of grounded conductors 42 and 43. Valves 40 and 41 are connected to provide for trailing operation of valve 41 with respect to valve 40. The main control electrode 41c of trailing valve 41 is connected through resistor 44, secondary winding 18c and conductor 45 to an intermediate voltage point of a voltage divider comprising resistors 46, 47, 48 and 49 connected in series relationship. This divider is supplied with direct voltage from secondary winding 23b through rectifiers 50 and 51. The cathodes 40b and 41b of both timing valves are connected to a second intermediate point of this divider which second point is positive with respect to the point to which the control electrode 41c is connected. A second control electrode 41d of valve 41 is direct connected to its cathode. As a result of the foregoing connection, the voltage drop across resistor 48 of the voltage divider is applied to control electrode 41c to maintain the valve 41 normally non-conducting. However, when timing valve 40 conducts, the primary winding 18b of transformer 18 is energized and a turn-on voltage is induced in the secondary winding 18c which overcomes the negative bias and renders valve 41 conducting. Thus when the timing valve 40 becomes conducting during a positive half cycle of its anode voltage which is assumed to be the positive half cycle of the supply voltage, timing valve 41 becomes conducting during the next or negative half cycle of the supply voltage when positive voltage is applied to its own anode 41a. Consequently valve 41 will always operate in trailing response to valve 40. For controlling the period of conduction of valve 40, a double capacitor timing circuit is provided which comprises the two capacitors 52 and 53. Since this double capacitor timing circuit controls the time during which the timing valves 40 and 41 conduct, it also times the period during which the main ignitron valves conduct and supply welding current to the welding transformer. It is therefore referred to as the weld timer. Capacitor 53 is connected across cathode 40b and main control electrode 40c of leading timing valve through current limiting resistors 54 and 54a. A second control electrode 40d of timing valve 40 is connected to the common terminal of a resistor 55 and a capacitor 55a which are connected in series relationship across the terminals of secondary winding 23b and which constitute a static phase shift circuit. This phase shift circuit is adjusted to provide an alternating voltage on the auxiliary control electrode 40d which permits the valve 40 to become conducting only during the early part of the positive half cycle of its anode voltage, i. e., the first 30 degrees.

With supply switch 6 in the closed position, timing capacitors 52 and 53 are charged by the voltage across conductors 42 and 45. The charging circuit for capacitor 53 is traced from conductor 42 through adjustable resistor 56, anode-cathode circuit of diode 57, resistor 58 to conductor 45, and as a result, capacitor 53 is charged positive at its lower terminal and negative at its upper terminal 53a. These timing capacitors 52 and 53 are connected in a local discharge circuit with the adjustable resistor 56. It extends from conductor 42 through capacitor 53, resistor 56, capacitor 52 to conductor 42. Resistor 56 is very much greater than resistor 59 and its adjustment is dominant in determining the time constant of the timing circuit. During standby, the capacitors 52 and 53 are charged so that their voltages oppose each other in the local circuit with the negative terminal of capacitor 53 connected to control electrode 40c to maintain timing valve 40 inactive.

Action of the weld timer is started by rendering conducting an initiating valve 60 which is preferably a thyratron provided with an anode 60a, a cathode 60b and a main control electrode 60c and an auxiliary or shield control electrode 60d. The auxiliary electrode 60d is connected to an intermediate point of a static phase shift circuit which comprises capacitor 61 and resistor 62 connected in series relationship with each other across the secondary winding 23b. The phase of the voltage supplied to the control electrode 60d is such that valve 60 can begin conducting only in the early portion of the positive half cycle of its anode voltage and subject of course to the control imposed by the main control electrode 60c. This main control electrode is connected through resistor 63, diode valve 64 and resistor 65 to the negative terminal of voltage divider resistor 49, and the cathode 60b is connected through a potentiometer 66 and resistor 58 to an intermediate point of the voltage divider which is positive with respect to the point of connection of the control electrode. Consequently, initiating valve 60 is maintained normally non-conducting by the negative bias on its control electrode 60c. It may be rendered conducting by closing the initiating switch 67 to connect the cathode of valve 64 to a point of positive voltage and thus to permit the voltage of the control electrode 60c to rise to the positive value existing at that instant on the lower terminal 68a of a capacitor 68 which together with a second capacitor 69 and an adjustable resistor 70 constitute an adjustable resistance capacitance timing circuit for timing the interval between conducting periods of the initiating valve 60 and thus time the period during which the main ignitron valves 9 and 10 are maintained non-conducting and prevented from supplying current to the welding transformer. It is therefore referred to as the "cool timer."

In the standby condition, the capacitors 68 and 69 of the cool timer are charged by the voltage across the conductors 42 and 45. The standby charging circuit for capacitor 69 is from conductor 42 through conductor 71, diode valve 72, and capacitor 69 to conductor 45. As a result, the polarity of the charge on capacitor 69 is positive at the terminal 69a. The standby charging circuit for capacitor 68 is through the diode 72 as before, then through the adjustable resistor 70, and capacitor 68 to conductor 45, with the result that the polarity of the charge on the capacitor 68 is positive at the terminal 68a. It is this positive voltage of terminal 68a which is in readiness to be applied to the control electrode 60c of the initiating valve when the diode 64 is rendered non-conducting by starting switch 67.

The main timing charges on capacitors 68 and 69 for timing the cool period are obtained from the secondary windings 73b and 73c of a transformer 73, of which the primary winding 73a is connected in the anode circuit of an electric valve 74. This valve is preferably a thyratron and is provided with an anode 74a, a cathode 74b, a main control electrode 74c and an auxiliary control electrode 74d. Its cathode 74b is connected through conductors 71, 42 and 43 to the midtap of the supply transformer secondary winding 23b, and its anode 74a is connected through transformer 73 and conductor 75 to the same end terminal of secondary winding 23b as that to which the anode 40a of the leading timing valve 40 of the weld timer is connected. Its main control electrode 74c is direct connected to the main control electrode 41c of trailing timing valve 41 so that it has impressed on it the same turn-on voltage which is supplied from the secondary winding 18c to the control electrode circuit of valve 41. Its auxiliary control electrode 74d is connected to the common terminal of a capacitor 76 and a resistor 77 which are connected in series relationship across the terminals of secondary winding 23b to provide a static phase shift circuit. The voltage which is supplied from this phase shift circuit to auxiliary control electrode 74d limits the period within which conduction may be initiated in valve 74 to the final three-fourths of the positive half cycle of its anode voltage. In other words the valve 74 is prevented from conducting in the first 45 degrees of its positive half cycle of anode voltage.

From the anode 74a of valve 74 to the anode 40a of leading timing valve 40 are connected in series relationship a voltage dropping resistor 78 and a rectifier 79 which is preferably a dry plate surface contact type rectifier such as a selenium disk rectifier. The resistor 78 is so chosen that when the valve 40 is energized and conducting, the voltage drop across resistor 78 is approximately equal to half the voltage between the midtap of secondary winding 23b and the supply conductor 80 which is connected to an end terminal thereof. Thus, the transformer 73 has half normal excitation during the period in which leading timing valve 40 is conducting prior to the period in which valve 74 becomes conducting and the capacitors 68 and 69 of the cool timer are charged to half normal voltage. An adjustable potentiometer 81 connected across the portion 73c of the secondary winding in the charging circuit serves to adjust the charging voltage to the desired value, and a diode rectifier 82 determines the polarity of the charging current supplied by the transformer 73 so that the capacitors will be charged positive at terminal 69a and negative at terminal 68a. It is to be noted that the common terminal of portions 73b and 73c of the transformer secondary winding is not connected to conductor 45. If it were so connected, the voltage at terminal 68a could not as a result of discharge of capacitor 68 become sufficiently positive to fire the initiating valve 60. Therefore, in order to assure the correct ratio of voltages on the capacitors 68 and 69 even though the common terminal of 73b and 73c is not connected to conductor 45, an auxiliary charging circuit is provided for capacitor 69. It comprises an additional secondary winding 73d on transformer 73 and a diode rectifier 83 connected in series relationship across the terminals of timing capacitor 69. Since the voltages of secondary windings 73b, 73c and 73d have a constant ratio, the ratio of the voltages supplied to capacitors 68 and 69 will be constant.

With the foregoing understanding of the elements and their organization, the operation of the system will readily be understood from the following description. The system is energized by closing the line switch 6 to connect conductors 7 and 8 to the energized supply conductors 4 and 5. This energizes the operating winding 13c of relay 13 which, after a predetermined interval of time, closes its contacts 13a and 13b to complete the firing circuits for the main ignitron valves 9 and 10. It also energizes the primary winding 22b of transformer 22 and the primary winding 23a of control voltage supply transformer 23. As a result of the energization of transformer 22, capacitors 17 and 27 of the timing branches of the weld timer are charged and apply negative bias voltages to the control electrodes 11c and 12c of the firing circuit valves 11 and 12. Electric valves 9, 11 and 40 are all poled to conduct during half cycles of the supply voltage in which supply conductor 8 is positive, and electric valves 10, 12, 41 and 60 are connected to conduct during negative half cycles of the line voltage, i. e., half cycles in which the voltage of supply conductor 7 is positive.

During standby, weld timing capacitors 52 and 53 are charged by the voltage across conductors 42 and 45 with the negative terminal of capacitor 53 connected to control electrode 40c of the timing valve and with the voltage of the two capacitors opposing each other in the local circuit through potentiometer 56. Timing valve 40 is thus maintained below cutoff. Initiating valve 60 is maintained below cutoff by the negative bias voltage due to the connection of control electrode 60c through diode 64 and resistor 65 to the negative point of the voltage divider. As previously explained, capacitors 68 and 69 of the cool timer are charged positive at the terminals 68a and 69a during the standby period.

A timed welding period is initiated by closing pushbutton switch 67 to connect the cathode of diode valve 64 to a point on the voltage divider which is more positive than the voltage of cathode 60b of the initiating valve. As a result, the diode is rendered non-conducting and the positive voltage of terminal 68a of capacitor 68 is applied to the control electrode 60c. Valve 60 becomes conducting in the first succeeding full half cycle of its positive anode voltage. As a result capacitor 53 is charged through a circuit which extends from the left-hand terminal of secondary winding 23b of transformer 23, anode-cathode circuit of initiating valve 60, diode rectifier 84, capacitor 53 and conductors 42 and 43 to the midtap of the secondary winding. At the same time the capacitor 52 of the weld timer is charged through the anode-cathode circuit of initiating valve 60, adjustable potentiometer 66, rectifiers 85 and 86 and conductors 42 and 43 to the midtap of secondary winding 23b. During the first 90 degrees of the half cycle charging period, terminal 53a of capacitor 53 and terminal 52a are charged approximately to the full positive peak value of the charging voltage. The voltages of capacitors 53 and 52 are additive in their local circuit and the positive voltage at terminal 53a is applied to the control electrode 40c of the timing valve 40. Consequently, it begins to conduct in the first full positive half cycle of anode voltage following initiation of conduction in valve 60. In the first half cycle of conduction by valve 40, the primary winding 18b of transformer 18 and the primary winding 73a of transformer 73 are energized. Owing to the inclusion of resistor 78 in the circuit, primary winding 73a is energized at half line voltage, i. e., half of the voltage between an end terminal and the midtap of secondary winding 23b. As a result of energization of transformer 73 at half normal voltage, the capacitors 68 and 69 are charged to half normal voltage. In this charging operation, the polarity of the charge on capacitor 68 is reversed so that its voltage at terminal 68a is now negative. This negative voltage is applied to the control electrode of initiating valve 60 and prevents it from again becoming conducting in the next positive half cycle or at any time during the remainder of the weld period and the immediately following cool period. As a result the weld time capacitors are disconnected from the alternating charging source and are permitted to discharge into each other and the voltage supplied to the control electrode 40c begins to decrease in accordance with the capacitor voltage v. time discharge curve.

The energization of secondary winding 18c renders valve 41 conducting in trailing response to conduction in valve 40. In other words the valve 41 becomes conducting in the next succeeding or negative half cycle of line voltage in which its own anode voltage is positive. In each half cycle in which timing valve 40 conducts, the leading firing valve 11 and leading ignitron valve 9 also conduct. Similarly, in each half cycle in which valve 41 conducts, trailing firing valve 12 and trailing main ignitron valve 10 also conduct. Each half cycle of conduction by one of the ignitron valves results in a half cycle of welding current being supplied to the work pieces through the welding electrodes 1 and 2. As the voltage at the capacitor terminal 53a which is supplied to control electrode 40c becomes decreasingly positive, the weld time period approaches its termination. The voltage which is supplied to the anode 74a of valve 74 during the next to the last half cycle of welding current conducted by the leading ignitron valve 9 is represented in Fig. 2B by the first positive half cycle of curve 87. Since the valve 40 must conduct in this same half cycle to fire the ignitron valve 9, a voltage is induced in secondary winding 18c which is applied to the control electrode 74c. This voltage is represented by the curve 88 and, as shown, its first half cycle is negative when the anode voltage of the valve is positive and consequently it prevents valve 74 from firing. The result is that capacitors 68 and 69 of the cool timer are charged only to half normal full value by the half full voltage induced in the secondary windings 73b, 73c and 73d as a result of conduction by the valve 40. The voltage at the cathode of diode valve 82 is represented in Fig. 2A by the curve 89 and the voltage at the cathode and the anode of valve 83 is represented by the first half of the positive half cycle of curve 90. The last half of the half cycle represents the voltage at the anode only. The capacitors 68 and 69 are charged to the peak values of the voltages represented by curves 89 and 90 and after these voltages pass their peaks, the voltages at the capacitor terminals 68a and 69a begin to decay in accordance with curves 91 and 92, respectively.

As the current conducted by valve 40 in this next to last half cycle of conduction by ignitron valve 9 begins to decrease, the voltage supplied to control electrode 74c from secondary winding 18c becomes decreasingly negative and then during the next half cycle in which the voltage of anode 74 is negative it increases to a maximum positive value at point 88a after which it decreases in accordance with the portion of the curve between points 88a and 88b. The valve 74 cannot conduct at this time since its anode voltage is negative.

At the time represented by the point 88b, the valve 40 is again becoming conducting to fire the leading ignitron for the last positive half cycle of welding current in the weld time period. The current conducted by valve 40 in this last half cycle induces a voltage in secondary winding 18c which is represented by the second negative half cycle of curve 88. It drives the control electrode 74c negative at the instant when the anode supply voltage 87 is becoming positive and valve 74 is again prevented from becoming conducting. Simultaneously, voltages are induced in secondary windings 73b, 73c and 73d and the resulting voltage at the cathode of valve 82 and at the anode of valve 83 are represented by the second half cycles of curves 89 and 90, and once again the voltages at capacitor terminals 68a and 69a are increased to the peak values 89a and 90a, and again begin to decay in accordance with curves 91 and 92.

As the current conducted by valve 40 decreases, the voltage supplied to control electrode 74c decreases from its maximum negative value at 88c to 0 and then in the next half cycle in which the trailing ignitron 10 conducts its last negative half cycle of welding current, it increases to its maximum positive value at 88d and then decreases towards 0.

It is assumed that the weld timing capacitors 52 and 53 have timed out so that the voltage supplied to control electrode 40c has become more negative than the critical firing voltage at some instant between points 87a and 87b. Thus valve 40 will not become conducting in its next positive half cycle of anode voltage which corresponds to and is in phase with the third positive half cycle of curve 87 which represents the anode voltage of valve 74; no voltage will be induced in secondary winding 18c and no negative voltage will be supplied to control electrode 74c. Consequently, at the instant 87b, i. e., at the beginning of the third positive half cycle of anode voltage of valve 74, the voltage on control electrode 74c is more positive than the critical firing voltage. Valve 74 is prevented from firing at this instant, however, by the dephased voltage on the shield grid control electrode 74d which is represented by curve 93. However, at the instant represented by point 93a the voltages of both control electrodes 74c and 74d are more positive than the critical firing values and valve 74 conducts.

As a result of conduction by valve 74, energization of the primary winding 73a is increased from half normal full voltage to normal full voltage and the timing capacitors 68 and 69 are charged to the new full peak voltages which are represented in Fig. 2A by points 89b and 90b. The instant in time which corresponds to the points 89b and 90b marks the beginning of the cool time delay period. At this instant the voltage of cool timing capacitor terminal 68a is negative and since it is supplied to the control electrode 60c, the weld initiating valve 60 cannot be fired even though the initiating switch 67 is maintained depressed.

The cool time initiating valve 74 does not become conducting in the next positive half cycle of its anode voltage, i. e., the fourth positive half cycle of curve 87, because by this time the voltage of control electrode 74c as represented by curve 88 has become more negative than its critical firing value.

At the end of the predetermined cool time delay period which instant is represented by point 89c, the voltage at cool timing capacitor terminal 68a attains the critical firing value, and if the initiating switch 67 is still maintained depressed, the weld time initiating valve 60 will fire in the next positive half cycle of its anode voltage 60a to initiate a repetition of the operation described in the foregoing. Thus the point 89c marks the end of the cool time delay and the beginning of the next succeeding weld time period.

The action of the valve 74 to effect a substantial increase on the voltage on the cool timing capacitors 68 and 69 insures that the cool timing period will actually begin at the instant in time represented by points 89b and 90b. If the voltage on these capacitors were not very substantially increased at this point, a large drop in line voltage caused by a sudden increase in load would decrease the voltages supplied by transformer 73 to the cool timing capacitors 68 and 69 below the voltage which actually exists on these capacitors at such instant. The unavoidable net result of such sudden decrease in line voltage would have been to cause the cool time capacitors to begin their timing discharge one cycle earlier at the instant of time represented by points 89a and 90a. In other words, the timing would be in error by one full cycle and this would be highly undesirable. The substantial increase in voltage which is applied to the timing capacitors as a result of conduction of valve 74 thus prevents line voltage drops from "fooling" the cool timer.

Although in accordance with the provisions of the patent statutes this invention is described in concrete form and the principle thereof has been explained together with the best mode in which it is now contemplated applying that principle, it will be understood that the apparatus shown is merely illustrative and that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. Timing apparatus comprising a pair of alternating voltage supply terminals, a first electric valve provided with an anode-cathode circuit supplied from said terminals and with a control electrode, an initiating switch and a second electric valve having an anode-cathode circuit supplied from said terminals and a control electrode connected to be responsive to actuation of said switch for causing said second valve to produce an electrical impulse, a first timing circuit set in operation in response to said impulse for supplying a timing voltage to the control electrode of said first valve to effect a variation in its conductivity enduring for a first predetermined interval of time, and a second timing circuit responsive to initiation of said variation in conductivity for supplying a voltage to the control electrode of said second valve to render said second valve ineffective to exert further control on said first timing circuit during the remainder of said time interval and responsive to the termination of said variation in conductivity for supplying a timing voltage to render said second valve effective to supply a further electrical impulse to said first timing circuit to effect a repeat timing operation a predetermined interval of time after the end of said first interval comprising first and second capacitors, means for supplying simultaneously to said capacitors charging voltages related to the capacitances thereof to charge said capacitors with different quantities of electricity, an adjustable resistor for completing an electric circuit including said capacitors with terminals of unlike polarity toward each other to provide for discharge of one of said capacitors into the other in response to interruption of said charging means, and a connection from the terminal of one of said capacitors to said control electrode of said second valve.

2. Timing apparatus comprising a pair of alternating voltage supply terminals, a first electric valve provided with an anode-cathode circuit supplied from said terminals and with a control electrode, an initiating switch and a second electric valve having an anode-cathode circuit supplied from said terminals and a control electrode connected to be responsive to actuation of said switch for causing said second valve to produce an electrical impulse, a first timing circuit set in operation in response to said impulse for supplying a timing voltage to the control electrode of said first valve to effect a variation in its conductivity enduring for a first predetermined interval of time, and a second timing circuit responsive to initiation of said variation in conductivity for supplying a voltage to the control electrode of said second valve to render said second valve ineffective to exert further control on said first timing circuit during the remainder of said time interval and responsive to the termination of said variation in conductivity for supplying a timing voltage to render said second valve effective to initiate a repeat timing operation a predetermined interval of time after the end of said first interval comprising first and second capacitors, an adjustable resistor for completing an electric circuit including said capacitors, an electrical connection from a terminal of one of said capacitors to the control electrode of said second valve, means for initially supplying voltages of relatively low values to said capacitor poled to produce a negative voltage at said connection, and means responsive to the termination of said variation in conductivity for simultaneously supplying to said capacitors charging voltages of relatively high value and poled with terminals of unlike polarity toward each other and with the voltage of said connection negative thereby to supply to the control electrode of said second valve a negative voltage which becomes decreasingly negative to render said second valve active to produce a repeat operation an interval of time after termination of said first interval of time.

3. Timing apparatus comprising a pair of alternating voltage supply terminals, a first electric valve provided with an anode-cathode circuit supplied from said terminals and provided with a control electrode, an initiating switch and a second electric valve having an anode-cathode circuit supplied from said terminals and a control electrode connected to be responsive to actuation of said switch for causing said second valve to produce an electrical control impulse, a first timing circuit responsive to said impulse for supplying a timing voltage to the control electrode of said first valve to initiate and maintain conduction in its anode-cathode circuit for a first predetermined interval of time, a second timing circuit responsive to said initiation of conduction for supplying a control voltage to the control electrode of said second valve to render it ineffective to control said first timing circuit during the remainder of said time interval and responsive to termination of said conduction at the end of said time interval for supplying a decreasing negative timing voltage to the control electrode of said second valve to render said second valve effective to supply a furthter impulse to said first timing circuit to effect a repeat timing operation a predetermined interval of time after the end of said first time interval comprising first and second capacitors, means for supplying simultaneously to said capacitors charging voltages having a predetermined relationship to their capacitances to charge said capacitors with different quantities of electricity, an adjustable resistor for completing an electric circuit including said capacitors having their terminals of unlike polarity toward each other to provide for discharge of one of said capacitors into the other in response to interruption of said charging means and a connection from the terminal of one of said capacitors to said control electrode of said second valve.

4. Timing apparatus comprising a pair of alternating voltage supply terminals, a first electric valve provided with an anode-cathode circuit supplied from said terminals and provided with a control electrode, an initiating switch and a second electric valve having an anode-cathode circuit supplied from said terminals and a control electrode connected to be responsive to actuation of said switch for causing said second valve to produce an electrical control impulse, a first timing circuit responsive to said impulse for supplying a timing voltage to the control electrode of said first valve to initiate and maintain conduction in its anode-cathode circuit for a first predetermined interval of time, a second timing circuit responsive to said initiation of conduction for supplying a control voltage to the control electrode of said second valve to render it ineffective to control said first timing circuit during the remainder of said time interval and responsive to termination of said conduction for supplying a decreasing negative timing voltage to the control electrode of it to render said second valve effective to initiate a repeat timing operation a predetermined interval of time after the end of said first time interval comprising first and second capacitors, a third electric valve supplied from said terminals and responsive to said termination for supplying voltage to said capacitors only during the positive half cycle of said alternating voltage immediately following said termination, an adjustable resistor for completing an electric circuit including said capacitors in series relationship with terminals of unlike polarity toward each other to provide for discharge of one of said capacitors into the other in response to termination of said charging voltages, and a connection from the terminals of one of said capacitors to said control electrode of said second valve.

5. Timing apparatus comprising a pair of alternating voltage supply terminals, a first electric valve provided with an output circuit supplied from said terminals and with an input control circuit, a resistance-capacitance timing circuit connected to said input circuit, an initiating switch and a second electric valve provided with an output circuit connected to said timing circuit and with an input circuit connected to be responsive to actuation of said switch for supplying a charging voltage to the capacitors of said timing circuit to initiate and maintain conduction in the output circuit of said first valve for a predetermined interval of time, and a second timing circuit responsive to said initiation of conduction for supplying a hold-off voltage to the input circuit of said second valve to render said second valve ineffective for the remainder of said time interval and responsive to the termination of said conduction for supplying a timing voltage to render said second valve effective to supply a charging voltage a predetermined interval of time after the end of said first time interval comprising first and second capacitors, means for simultaneously supplying to said first and second capacitors charging voltages related to their capacitances to produce thereon charges of unequal quantities of electricity, an adjustable resistor for completing an electric circuit including said capacitors with terminals of unlike polarity toward each other to provide for discharge of one of said capacitors into the other in response to interruption of said charging means for said second timing circuit, and a connection from the terminal of one of said first and second capacitors to said input circuit of said second valve.

6. Timing apparatus comprising a pair of alternating voltage supply terminals, a first electric valve provided with an output circuit supplied from said terminals and with an input control circuit, a resistance-capacitance timing circuit connected to said input circuit, an initiating switch and a second electric valve provided with an output circuit connected to said timing circuit and with an input circuit connected to be responsive to actuation of said switch for supplying a charging voltage to the capacitors of said timing circuit to initiate and maintain conduction in the output circuit of said first valve for a predetermined interval of time, and a second timing circuit responsive to said initiation of conduction for supplying a hold-off voltage to the input circuit of said second valve to render said second valve ineffective for the remainder of said time interval and responsive to the termination of said conduction for supplying a timing voltage to render said second valve effective to supply a charging voltage a predetermined interval of time after the end of said first time interval comprising first and second capacitors, means responsive to conduction in said output circuit of said first valve for charging said first and second capacitors to a relatively low voltage during said time interval and responsive to termination of conduction in said first valve for charging said first and second capacitors to relatively high voltages related to their capacitances to produce thereon charges of unequal quantities of electricity, an adjustable resistor for completing an electric circuit including said first and second capacitors in series with terminals of unlike polarity toward each other to provide for discharge of one of said capacitors into the other in response to interruption of said charging means, and a connection from a terminal of one of said first and second capacitors to said input circuit of said second valve.

7. Timing apparatus comprising a pair of alternating voltage supply terminals, a first electric valve provided with an output circuit supplied from said terminals and with an input control circuit, a resistance-capacitance timing circuit connected to said input circuit, an initiating switch and a second electric valve provided with an output circuit connected to said timing circuit and with an input circuit connected to be responsive to actuation of said switch for supplying a charging voltage to the capacitors of said timing circuit to initiate and maintain conduction in the output circuit of said first valve for a predetermined interval of time, and a second timing circuit responsive to said initiation of conduction for supplying a hold-off voltage to the input circuit of said second valve to render said second valve ineffective for the remainder of said time interval and responsive to the termination of said conduction for supplying a timing voltage to render said second valve effective a predetermined interval of time after the end of said first time interval comprising first and second capacitors, means responsive to conduction in said output circuit of said first valve for charging said first and second capacitors to a relatively low voltage during said time interval, a third electric valve having an input circuit and having an output circuit supplied from said terminals and connected to said first and second capacitors, a transformer having a primary winding in the output circuit of said first electric valve and a secondary winding in the input circuit of said third electric valve for rendering said third valve conducting in response to termination of conduction in said first valve to charge said first and second capacitors to relatively high voltages related to their capacitances, an adjustable resistor for completing an electric circuit including said first and second capacitors in series with terminals of unlike polarity toward each other to provide for discharge of one of said capacitors into the other in response to termination of conduction of said third valve, and connections from the terminals of one of said capacitors to the input circuit of said second electric valve.

8. Timing apparatus comprising a pair of alternating voltage supply terminals, a first electric valve provided with an output circuit supplied from said terminals and with an input control circuit, a resistance-capacitance timing circuit connected to said input circuit, an initiating switch and a second electric valve provided with an output circuit including an anode and a cathode connected to said timing circuit and with an input circuit including a control electrode connected to be responsive to actuation of said switch for supplying a charging voltage to the capacitors of said timing circuit to cause said timing circuit to supply a timing voltage to initiate and maintain conduction in said output circuit of said first valve for a predetermined interval of time, a second timing circuit responsive to said initiation of conduction for supplying a hold-off voltage to the input circuit of said second valve for the remainder of said time interval and responsive to the termination of said conduction for supplying a decreasing negative timing voltage to said control electrode to render said second valve effective to supply a charging voltage a predetermined interval of time after the end of said first time interval comprising first and second capacitors, a third electric valve having an input circuit and having an output circuit supplied from said terminals and connected to said first and second capacitors, a transformer having a primary winding in the output circuit of said first electric valve and a secondary winding in the input circuit of said third electric valve for rendering said third valve conducting in response to termination of conduction in said first valve to charge said first and second capacitors to voltages related to their capacitances, an adjustable resistor for completing an electric circuit including said first and second capacitors in series with terminals of unlike polarity toward each other to provide for discharge of one of said capacitors into the other in response to termination of conduction in said third valve, an electrical connection from the common terminal of said first and second capacitors to the cathode of said second valve and an electrical connection from the negative terminal of one of said first and second capacitors to said control electrode of said second valve.

References Cited in the file of this patent

UNITED STATES PATENTS

| | | |
|---|---|---|
| 2,312,491 | Seiwert | Mar. 2, 1943 |
| 2,329,090 | Smith | Sept. 7, 1943 |
| 2,333,363 | Collom | Nov. 2, 1943 |
| 2,340,077 | Pearson | Jan. 25, 1944 |
| 2,359,142 | Murcek | Sept. 26, 1944 |
| 2,533,369 | Hartwig | Dec. 12, 1950 |
| 2,600,941 | Undy | June 17, 1952 |
| 2,623,146 | Anger | Dec. 23, 1952 |

OTHER REFERENCES

Principles of Radar M. I. T. Radar School Staff, pp. 97–99, published by McGraw-Hill Book Co. Inc. (1952).

UNITED STATES PATENT OFFICE
CERTIFICATE OF CORRECTION

Patent No. 2,864,947 December 16, 1958

Maurice E. Bivens et al.

It is hereby certified that error appears in the printed specification of the above numbered patent requiring correction and that the said Letters Patent should read as corrected below.

Column 2, line 35, after "understanding" insert -- of --; column 3, line 75, strike out "cycles", second occurrence; column 8, line 72, after "voltage" insert a period; column 11, line 5, for "furthter" read -- further --; lines 37 and 38, strike out "it to render said second valve" and insert instead -- said second valve to render it --.

Signed and sealed this 5th day of May 1959.

SEAL)
Attest:

KARL H. AXLINE
Attesting Officer

ROBERT C. WATSON
Commissioner of Patents